United States Patent [19]
Connick

[11] 3,865,351
[45] Feb. 11, 1975

[54] PICKLE MANUFACTURING
[75] Inventor: Francis Glenn Connick, Downers Grove, Ill.
[73] Assignee: Swift & Company, Chicago, Ill.
[22] Filed: Dec. 8, 1972
[21] Appl. No.: 313,586

Related U.S. Application Data
[62] Division of Ser. No. 94,064, Dec. 1, 1970, Pat. No. 3,717,479.

[52] U.S. Cl............... 259/4, 99/516, 99/535, 137/99, 259/8
[51] Int. Cl............ G05d 11/02, B01f 3/12
[58] Field of Search............ 99/484, 485, 486, 487, 99/492, 493, 516, 517, 532, 533, 534, 535, 536; 137/99; 426/342, 442; 259/7, 8, 4

[56] References Cited
UNITED STATES PATENTS
| | | | |
|---|---|---|---|
| 2,870,776 | 1/1959 | Marsh | 137/99 |
| 3,232,209 | 2/1966 | Earl et al. | 99/486 |
| 3,326,530 | 6/1967 | Schlernitzauer | 99/534 X |
| 3,428,487 | 2/1969 | Allen | 259/8 X |
| 3,433,464 | 3/1969 | Swafford et al. | 259/8 |
| 3,608,869 | 9/1971 | Woodle | 259/7 |

*Primary Examiner*—John W. Huckert
*Assistant Examiner*—John M. Jillions
*Attorney, Agent, or Firm*—Edward T. McCabe; Charles E. Bouton; Wilbur C. Davis

[57] ABSTRACT

Separate streams of saturated brine and a dose mix of liquid sugar or dextrose, water and additional ingredients useful in curing, are strained, metered and combined whereafter the combined stream is cooled and stored against need in curing operations.

9 Claims, 1 Drawing Figure

PATENTED FEB 11 1975 3,865,351
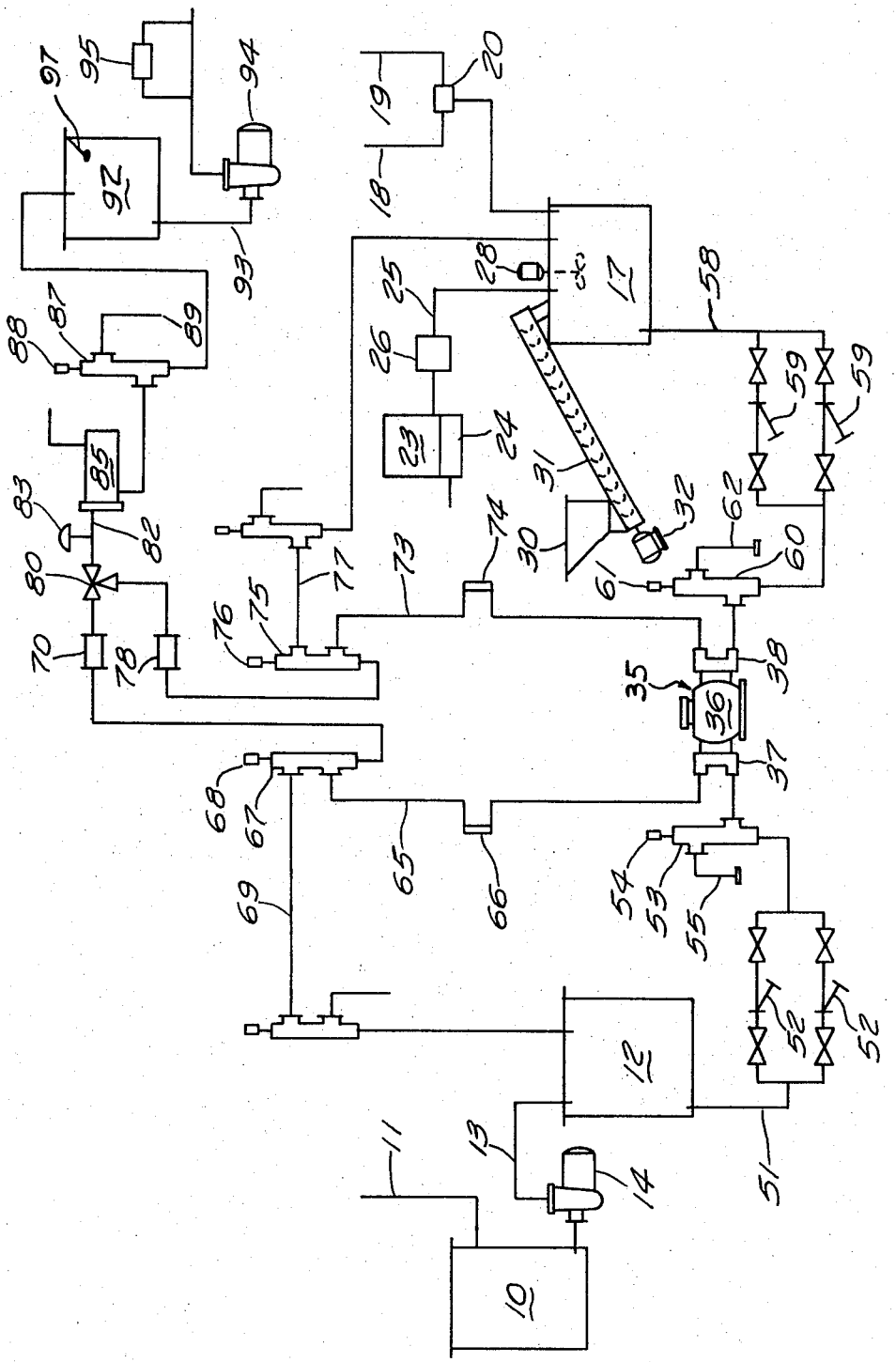

PICKLE MANUFACTURING

This application is a division of my copending application Ser. No. 94,064 filed Dec. 1, 1970 now U.S. Pat. No. 3,717,479. This invention relates to the manufacture of liquid curing pickle formulas; and more precisely concerns an improved system of apparatus for semi-automatically mixing and proportioning pickle solution ingredients to maintain a volume of finished pickle formula for use in curing operations.

Liquid curing pickle formulas have previously been prepared in large batches and then set aside for cooling for a period of 1 or 2 days. Various of the ingredients required in pickle formulas present solubility problems and under some conditions cannot be dissolved with rapidity or maximum quantity in aqueous solutions containing other ingredients. Phosphate salts are known to present many problems of this nature. Furthermore, when preparing large volumes of liquid pickle formula on a day-to-day or every-other-day basis, it has been difficult to accurately apportion water and all of the necessary ingredients in exactly the same amounts for each batch. Because of the resultant slight variation in ingredients from batch to batch, it has been necessary in the subsequent curing operations to establish a minimum required curing time based upon the least desirable curing formulation that is likely to be experienced. With the likelihood in inaccuracies in repeating the same formulation day-after-day it has thus been necessary to require relatively long curing times for the ultimate product. However, if it could be assured that an optimum curing pickle formulation could be replicated with accuracy and containing the maximum quantities of curing salts, the subsequent curing times could be reduced, with confidence, to the minimum time required by the optimum formula.

Accordingly, it is an object of the present invention to provide an improved apparatus to semi-automatically apportion and mix curing formula ingredients so as to enable a reduction in curing time.

Another object of the present invention is to provide an improved apparatus for manufacturing a liquid pickle formulation that will reduce the manual labor required.

It is still another object of the present invention to provide an apparatus for preparing liquid pickle formulation in the quantities and at intervals consistent with current needs of the curing operations.

Yet another object of the present invention is to provide an improved apparatus for preparing a liquid pickle formulation wherein the solubilizing of the various ingredients is facilitated under optimum conditions.

Still another object of the present invention is to provide an improved apparatus for producing liquid pickle formulations and rapidly chilling same on a continuous flow basis.

Still another object of the present invention is to provide an improved system of apparatus for producing liquid pickle formulations which may be readily cleaned and sanitized.

Basically, the present invention involves continuously exposing salt to water to produce a saturated brine that is then stored. Separately, a supply of liquid dextrose or liquid sugar is maintained in a heated condition and measured quantities thereof are periodically introduced into a mixing zone with measured quantities of water. The dextrose and water are agitated and additional formula ingredients such as phosphates and curing salts are added in measured weights, either in dry form or in pre-prepared solutions, and further mixed with the dextrose and water to produce a dose mix. Periodically and simultaneously, quantities of both saturated brine and dose mix are withdrawn in separately controlled streams bearing a desired ratio to one another and the separate streams are subsequently mixed to form a single flow of pickle formula. The pickle formula is then cooled and stored in a holding zone against demand from which it may be pumped to curing operations.

A system of apparatus devised for carrying out those steps comprises storage tanks for both brine and dextrose and mixing tank and means to supply dose ingredients thereto. The mixing tank and brine tank are connected to metering means operable to periodically and simultaneously deliver separately controlled streams from the respective tanks to a combined pickle line where they are combined and then cooled. Cooling means and also storage means are provided for the combined pickle formula.

Further objects and advantages of the present invention will be made known by the following detailed disclosure when read in conjunction with the drawing wherein:

The single FIGURE is a schematic representation of a preferred system of apparatus of the present invention.

According to a preferred method of the present invention a large quantity of solid salt (sodium chloride NaCl) is maintained in a replenishable body of water, commonly known in the trade as a lixator, to produce a saturated brine solution, a large quantity of which is pumped to a storage zone. Also a supply of liquid sugar or dextrose is similarly maintained, however, the liquid sugar or dextrose is held at a temperature sufficient to maintain a non-crystalline liquid which is usually between 122°–135°F., preferably 125°–130°F. At higher temperatures there is a tendency for carmelization to occur. Preferably the liquid sugar or dextrose is a solution containing approximately 68–69 percent solids such as product No. 2606 (68.0–69.0 percent solids, 31–32 percent moisture, pH 4.5–5.1, ppm iron 4.0 maximum, and dextrose equivalent 99.5 minimum) supplied by the Corn Products Company. Periodically, as required, a measured amount of the liquid sugar or dextrose is introduced into a measured quantity of water placed in a mixing zone and the two liquids are agitated. Preferably, the temperature of the water supply may be adjusted as for instance, by combining streams from hot and cold water sources. A preferred temperature for the water introduced into the mixing zone is 50°–90°F. Warmer water temperatures in that range tend to facilitate the dissolving of the additional ingredients.

While the liquid sugar or dextrose and water are being agitated, carefully measured weights of such additional ingredients are also introduced into the mixing zone. These include a phosphate salt such as tripolyphosphate and curing salts such as sodium erythorbate and sodium nitrite. The latter two items may advantageously be dissolved in small quantities of water prior to being introduced into the mixing zone.

The water, liquid sugar or dextrose, and curing ingredients are apportioned and mixed together sufficiently to produce a desired quantity of a dose mix of a recipe suitable for subsequent combining with saturated brine in a controlled ratio. A preferred formulation of ingredients of such a dose mix to produce a quantity of about 837.8 gallons is as follows:

| | |
|---|---|
| Water | 5,311 lbs. (637.73 gallons) |
| Dextrose (68–69% solids) | 2,191 lbs. (200.09 gallons) |
| Tripolyphosphate (Curafos) | 750 lbs. (Dry) |
| Sodium erythorbate | 50 lbs. (In solution) |
| Sodium nitrite | 30 lbs. 10 ozs. (In solution) |

Separately controlled streams of each of such dose mix and saturated brine are periodically and simultaneously withdrawn from the mixing zone and storage zone, respectively, at rates that are proportional to one another according to a desired ratio. Preferably each of the streams is strained to remove solid particles. A desired finished pickle formula utilizing the foregoing preferred dose mix formulation will require two parts of saturated brine to each part of the dose mix (however any other ratio may be selected to give a finished pickle that may be desired). Accordingly, the above-described quantity of dose mix will be sufficient, when mixed with brine in the amount of 16,667 lbs. (1,662.24 gallons) to produce a total of 2,500 gallons of finished pickle. However, according to the present method the period of time consumed for the production of that total quantity can be adjusted to almost any requirements.

The two separate streams of dose mix and saturated brine are subsequently merged into a single flow of finished pickle formula which is promptly thereafter cooled to about 35°F. A volume of the cooled pickle is preferably stored in a holding zone against the operational demands for the liquid in curing operations such as the stitch pumping of bacon and/or the artery pumping of hams, etc. Upon such demand, needed amounts of the cooled pickle are withdrawn by pumping from the holding zone, and the withdrawn pickle formula is constantly automatically tested for specific gravity to assure that the desired formulation is being maintained. The preferred pickle formula, according to the above-described dose mix and brine requirements, will have a density of 9.97 lbs. per gallon. Additionally, accuracy of the pickle formulation can be maintained by monitoring the flow rates of each of the separately controlled streams of dose mix and saturated brine.

A preferred system of apparatus for practicing the foregoing method is shown in the single FIGURE wherein a salt-dissolving tank (salt lixator) 10 adequate to maintain carload quantities of salt (NaCl) is serviced by a waterline 11 and is connected to a brine storage tank 12 by a brine conduit 13 and brine pump 14. The dose mix is prepared in a mixing tank 17 provided with a cold water supply line 18, hot water supply line 19 and mixing valve 20. A liquid sugar or dextrose supply tank 23 sufficient to contain 35,000 lbs. of liquid sugar or dextrose contains a heater 24, which may be either steam or electric, and is connected to deliver liquid sugar or dextrose to the mixing tank 17 by a liquid sugar or dextrose conduit 25 and liquid sugar or dextrose metering pump 26.

The mixing tank 17 is provided with an electrically powered agitator 28 having paddles or blades (not shown) disposed in the lower portion of the tank.

Delivery means for adding additional ingredients into the mixing tank are preferably a hopper 30 and a screw conveyor 31 powered by an electric motor 32. Preferably measured quantities of dry ingredients are first placed into the hopper 30 and after liquid sugar or dextrose and water have been premixed in the mixing tank 17 the motor 32 is energized to gradually feed the solids through screw conveyor 31, into the mixing tank.

Separate streams of brine and dose mix are withdrawn from the respective storage tank 12 and mixing tank 17 by means such as a metering pump generally 35 which is provided for dual output. Such a metering pump includes a common drive unit 36 and separate brine pump 37 and dose pump 38. Each of the latter pumps are preferably of the positive displacement type and are driven by variable speed connections so that the ratio of output of each pump can be carefully controlled. Several suitable metering pumps of this type are available commercially.

The brine pump 37 is connected to the storage tank 12 by means of a low pressure brine line 51. The brine line 51 is provided with a plurality of parallel arranged strainers 52 to separate solids from the brine. It is also provided with a three-way valve 53 for purposes of cleanup and sanitation. The three-way valve 53 is placed between the strainers 52 and the brine pump 37 and includes an actuator 54 and quick disconnect hot water line 55 for selectively introducing flush water downstream of the valve.

The mixing tank 17 is similarly connected to the dose pump 38 by means of a low pressure dose line 58 which also includes parallel strainers 59 and a three-way valve 60 placed between the strainers and the dose pump 38. The latter valve also includes an actuator 61 and a quick disconnect hot water line 62 for selectively introducing flush water into the system downstream of the three-way valve 60.

Metered brine expelled from the brine pump 37 travels through a brine delivery line 65 to which is mounted a pulsation dampener 66 closely adjacent the pump 37. Beyond the dampener is located another three-way valve 67 having an actuator 68 and a recycle line 69 which selectively returns brine to the storage tank 12. However, the brine delivery line 65 also extends beyond the valve 67 and includes a flow meter 70.

Similarly, the metered stream of dose mix expelled from dose pump 38 travels through a dose delivery line 73 also provided with a pulsation dampener 74 and a three-way valve 75. The latter valve 75 includes an actuator 76 and a recycle line 77 to selectively return dose mix to the mixing tank 17. Also the dose delivery line 73 extends beyond the valve 75 and includes a flow meter 78.

It may also be noted that each of the aforementioned recycle lines includes further three-way valves actuatable to be connected to the respective tank or to drains. When cleaning the system, hot water introduced at either of the three-way valves 53 and 60 is directed for a portion of time through the respective recycle lines 69 and 77 and directed into a sewer, but wash water is not normally directed into either storage tank 12 or mixing tank 17.

The liquid streams in brine delivery line 65 and dose delivery line 73 are combined at a flow means comprising a "T" connector 80 and a single pickle line 82 which contains a pressure regulator valve 83 set to maintain a positive pressure of about 30 p.s.i. at the discharge sides of pumps 37 and 38.

The pickle line 82 is directed into a heat exchanger 85 which is also serviced by a cooling medium such as ammonia or chilled brine from a cooling source, not shown. The heat exchanger 85 is selected of a sufficient size to provide a residence time for the pickle formula sufficient to obtain complete intermixing of the brine and dose mix and to reduce the temperature of the combined fluid flow to about 35°F. Beyond the heat exchanger 85 the pickle line 82 extends through a three-way valve 87, provided with an actuator 88 and a connection to a drain 89, and into a pickle holding tank 92.

During cleanout operations for a portion of the time that water is introduced through three-way valves 53 and 60, it is directed through the brine delivery line 65, dose delivery line 73, "T" connector 80, pickle line 82 and heat exchanger 85 and into the drain 89 through valve 87. Wash water is not normally directed into the pickle holding tank 92.

The pickle holding tank 92 is further provided with a discharge supply pipe 93 and pump 94 actuated on demand for the pickle formula in subsequent curing operations. The supply pipe 93 is also provided with specific gravity (density) measuring means 95 to analyze the finished liquid for proper composition. Should the composition deviate from limits established, the density measuring means 95 initiates an alarm calling attention of an operator to the need for either an adjustment in the metering pump generally 35 or in the quantities of ingredients going into the dose mix. Such an alarm condition may also automatically deenergize the pump 94 to cease discharge of the pickle and/or recycle the pickle to the holding tank 92.

Also the pickle holding tank 92 is provided with a liquid level sensing unit 97 which is electrically connected to control the drive 36 of metering pump generally 35. When the sensing unit 97 detects that the pickle storage tank is substantially full, the metering pump generally 35 is caused to be deenergized; and when the sensing unit detects that the level of liquid in holding tank 92 has fallen beneath a preset level, the metering pump is re-energized so as to refill the storage tank. In addition, it is advantageous to provide the storage tank 12 and mixing tank 17 with indicator means (not shown) sufficient to call attention of an operator to the respective liquid levels should they reach a nearly depleted condition.

Obviously many modifications and variations of the invention as hereinbefore set forth may be made without departing from the spirit and scope thereof, and, therefore, only such limitations should be imposed as are indicated in the appended claims.

I claim:

1. An improved apparatus for manufacturing a curing pickle solution, said apparatus comprising: a first brine storage tank; a second storage tank for liquid sugar or dextrose, said second storage tank having a heating means connected thereto; a mixing tank connected to receive liquid from said second storage tank and water from a supply thereof; delivery means positioned for adding additional ingredients into said mixing tank; metering means connected to said first brine storage tank and to said mixing tank, said metering means being operable to separately withdraw and regulate streams of liquid from each of said first brine storage and mixing tanks; and flow means connected to said metering means to combine said streams into a single flow.

2. The apparatus of claim 1 including a heat exchanger connected to said flow means to cool said single flow, and a holding tank connected beyond said heat exchanger.

3. The apparatus of claim 2 including a pump connected to discharge liquid from said holding tank and testing means connected to measure the specific gravity of discharged liquid.

4. The apparatus of claim 1 wherein said delivery means comprise a hopper, and screw conveyor connected between said hopper and said mixing tank.

5. The apparatus of claim 1 including flow lines between said first brine storage tank and said metering means and between said mixing tank and said metering means, and strainers located in each of said flow lines.

6. The apparatus of claim 1 including means to transfer measured amounts of liquid from said second storage tank to said mixing tank.

7. The apparatus of claim 1 wherein a pair of delivery lines extend between said metering means and said flow means, and each of said delivery lines includes pulsation dampeners and flow meters.

8. The apparatus of claim 7 wherein each of said delivery lines includes valves for recycling liquid to the respective first brine storage tank and mixing tank.

9. The apparatus of claim 2 wherein plural valve means are connected between the metering means and each of said first brine storage and mixing tanks and between said heat exchanger and said holding tank for flushing the system between such valves.

* * * * *